United States Patent [19]

Lauck

[11] 4,283,435

[45] Aug. 11, 1981

[54] OXIDIZED WHEY PROTEIN CONCENTRATE ENRICHED SHORTENING-CONTAINING BISCUITS

[75] Inventor: Robert M. Lauck, New City, N.Y.

[73] Assignee: Stauffer Chemical Company, Westport, Conn.

[21] Appl. No.: 973,506

[22] Filed: Dec. 26, 1978

Related U.S. Application Data

[63] Continuation of Ser. No. 750,946, Dec. 15, 1976, abandoned.

[51] Int. Cl.³ ............................................. A21D 2/34
[52] U.S. Cl. .................................... 426/551; 426/22; 426/23; 426/549; 426/583
[58] Field of Search .................. 426/22, 23, 549, 551, 426/583, 656, 657, 653, 552, 553, 554, 555

[56] References Cited

U.S. PATENT DOCUMENTS

| | | |
|---|---|---|
| 2,942,988 | 6/1960 | Erickson et al. ...................... 426/551 |
| 3,109,738 | 11/1963 | Tucker ................................. 426/551 |
| 3,269,843 | 8/1966 | McKee et al. ........................ 426/549 |
| 3,531,294 | 9/1970 | Glabau .............................. 426/22 X |
| 3,814,745 | 6/1974 | Melachouris .................... 426/583 X |
| 3,930,039 | 12/1975 | Kuipers ......................... 426/583 X |
| 3,941,895 | 3/1976 | Ash et al. ............................. 426/583 |
| 4,109,025 | 8/1978 | Lauck .................................. 426/551 |

Primary Examiner—Joseph M. Golian
Attorney, Agent, or Firm—Paul J. Juettner

[57] ABSTRACT

Shortening-containing protein enriched biscuits are obtained by using as protein fortifier, a whey protein concentrate wherein the whey protein is substantially oxidized.

11 Claims, No Drawings

OXIDIZED WHEY PROTEIN CONCENTRATE ENRICHED SHORTENING-CONTAINING BISCUITS

This is a continuation, of application Ser. No. 750,946 filed Dec. 15, 1976 and now abandoned.

The present invention relates to leavened baked goods and particularly to high protein, shortening-containing biscuits.

Biscuits are well known baked goods generally prepared from flour, sugar, salt, shortening, a leavening system of alkaline bicarbonate such as sodium or potassium bicarbonate and a leavening acid, water, and, optionally, milk solids. Additional components in minor amounts can include flavor and color agents, nutrient supplements, preservatives, antioxidants and reducing agents.

For convenience in preparing biscuits, self-rising flour which contained flour, sodium bicarbonate and leavening acid was used. Self-rising flour (or SRF) is presently defined in the Federal Register of May 2, 1961 Title 21, Part 15, Section 15.50(a), Definition and Standards of Identity, as follows:

"Self-rising flour, self-rising white flour, self-rising wheat flour, is an intimate mixture of flour, sodium bicarbonate, and one or more of the acid-reacting substances monocalcium phosphate, sodium acid pyrophosphate, and sodium aluminum phosphate. It is seasoned with salt. When it is tested by the method prescribed in paragraph (c) of this section, not less than 0.5% of carbon dioxide is evolved. The acid-reacting substance is added in sufficient quantity to neutralize the sodium bicarbonate. The combined weight of such acid-reacting substance and sodium bicarbonate is not more than 4.5 parts to each 100 parts of flour used."

The term "self-rising flour" used herein is intended to describe compositions within the definition set forth above. However, applicant does not intend to limit the use of his invention to such a definition.

Milkless biscuits have a low protein value as the only source of protein is the flour. A significant amount of shortening is generally used to prepare an acceptable biscuit. It would be desirable to protein fortify a biscuit without the necessity of changing the biscuit recipe such as reducing the amount of shortening required to produce the same.

Whey protein-phosphate isolates are well known in the prior art as substitutes for non-fat dried milk in baked goods as evidenced by McKee et al. U.S. Pat. No. 3,269,843. However, it is well known in the prior art that proteins in general, and protein phosphate isolates cannot be utilized in preparing bread. In particular, McKee at al. teach that whey-phosphate isolates which are generally termed lactalbumin phosphate are not usable in bread baking. McKee et al. do indicate that in order to use the lactalbumin phosphate in the baking of the bread, the lactalbumin phosphate must be used in combination with an oxidizing agent. It is also well known that proteins can be treated with hydrogen peroxide to effect bacteriostatic preservation as reported in Chem. Abstracts 17, 2458, Chem. Abstracts 59, 8043b, and Chem. Abstracts 70,46, 206v. Magnesium peroxide has also been used in oxidizing casein, cf. U.S. Pat. No. 704,662.

U.S. Pat. No. 3,814,745 discloses peroxide treating whey proteins prior to phosphate precipitation of the proteins. The product is taught to be useful as a non-fat dried milk replacer in bread.

In an attempt to protein fortify a biscuit, a whey protein concentrate was added as part of the ingredients in a normal self-rising flour type biscuit. The normal level of shortening was maintained. The biscuit had no internal adhesion and crumbled.

BRIEF DESCRIPTION OF THE INVENTION

In accordance with the present invention, it has been found that the problems of preparing protein enriched shortening-containing biscuits can be overcome by using as the protein fortifier in the shortening containing leavened baked goods, and particulary biscuits, a substantially oxidized whey protein concentrate. By this discovery, acceptable shortening-containing high protein biscuits of good structure can be prepared. In preparing biscuits, the protein content can be increased as much as 20% and more over and above the normal protein content of the biscuit.

Concentrated whey protein from cottage cheese whey is the preferred concentrate whey protein because the concentrate is characterized by a white color and bland taste.

DETAILED DESCRIPTION OF THE PRESENT INVENTION

The substantially oxidized whey protein concentrate used in the present invention can be derived from any cheese whey. Cheese whey is the by-product of the acid, or rennet coagulation of protein (i.e., casein) from milk in the manufacture of cheese. The whey obtained from the acid coagulation is called acid (cottage) whey and that obtained from rennet, sweet (cheddar) whey.

The acid coagulation of milk protein from milk involves either the addition of lactic acid producing bacteria (e.g., Lactobacillus sp.) or the addition of food grade acids such as lactic or hydrochloric acid (i.e., direct acidification). Regardless of the method used to acidify milk, acidification is allowed to proceed until a pH of about 4.6 is reached. At this pH, casein becomes insolubilized and coagulates as cheese curds. The cheese produced by this method is commonly known as cottage cheese. The whey obtained by the separation and removal of this cheese curd is called cottage cheese whey.

Sweet cheese whey is obtained by the separation and removal of coagulated casein produced by the addition of a proteolytic enzyme to milk. The proteolytic enzymes generally used are known as rennin and/or pepsin. Specific examples of cheese products produced by this general method are cheddar cheese, swiss cheese and mozzarella cheese.

The whey protein concentrates can be prepared from acid (cottage) or sweet (cheddar) whey or mixtures thereof. If a milky or cheesy flavor is desired, the sweet whey source can be used. If a bland flavor is desired, the acid whey is preferred. Blends of acid and sweet whey can be used when a slight milky flavor is desired.

The preferred cheese whey for use in preparing the concentrates used in the present invention is 100% acid (cottage cheese) whey or blends with up to 20% sweet cheese whey. The more preferred is 100% acid (cottage cheese) whey. The acid whey concentrate is preferred since it has a bland flavor which does not interfere with the other flavors in the product and a white color.

The cheese whey product is required to be a protein concentrate. As used herein, the term whey protein concentrate relates to a whey protein product having 25% or more whey protein solids. Such concentrations can be made by a number of processes including: the delactosing of whey; an electrodialysis procedure (e.g., as described by Stribley, R. C., Food Processing, Vol. 24, No. 1, p. 49, 1963); by reverse osmosis; by dextran gel filtration as described in U.S. Pat. No. Re. 27,806; or by ultrafiltration. An illustrative method for ultrafiltration is described by Horton, B. S. et al., Food Technology, Vol. 26, p. 30, 1972.

It has been found that the most effective results are obtained using an ultrafiltered acid (cottage cheese) when concentrate containing from about 40% to about 60% and preferably 50%±5% whey protein. In a typical process, cottage cheese whey is neutralized to a pH 6.4 with 50% caustic. After storage, the pH is then adjusted to 7.2 and any solids or precipitates are removed by centrifugal clarifiers. The clarified liquor is then pasteurized. The liquor is then fed into an ultrafiltration membrane unit. The retentate is condensed and spray dried. Protein products of 25% or more whey protein can be prepared by this process. Products generally comprising from 20–80% and preferably 40–60% protein (N×6.38), 10–30% ash and about 0.4% fat are obtained.

The whey protein concentrate must be substantially oxidized. By oxidation is meant oxidation of the sulfhydryl groups of the protein. Oxidation of the sulfhydryl groups generally occurs when the protein is treated with oxidizing agents such as peroxide. By substantially oxidized as used herein is meant that at least 40% of the sulfhydryl groups are oxidized. Preferably, at least 60% of the sulfhydryl groups are oxidized.

Any oxidizing agent which does not affect the final food status of the product can be used. While any food grade oxidizing agents such as the potassium and calcium bromate and iodate salts can be used, it is preferred that the protein is treated with a peroxide compound such as peroxide, magnesium peroxide, calcium peroxide and mixtures thereof. In connection with the alkali metal peroxides and particularly sodium peroxide, hydrolysis to the hydroxide, i.e., sodium hydroxide and hydrogen peroxide is substantially instantaneous when the metal peroxide is mixed with water. The primary reactant is hydrogen peroxide formed in situ. Because of the hydroxide formed, and if alkalinity is not desired, the alkali metal peroxide can be used in combination with hydrogen peroxide. Similarly, the alkaline earth metal peroxides also liberate hydrogen peroxide under reaction conditions. The preferred peroxides are hydrogen peroxide, sodium peroxide, and calcium peroxide. Most preferably the peroxide is hydrogen peroxide.

The peroxide is used in an amount sufficient to provide at least 0.006 gram of the peroxide moiety, i.e., the O—O— group, per gram of protein. Preferably about 0.008 to about 0.05 grams of the peroxide moiety are used per gram of protein. When using hydrogen peroxide aqueous solution at low strength of about 30% by weight of the peroxide solution are preferred for ease of handling. The peroxide content of each of the other named peroxides can be easily determined so as to provide the amounts necessary to give the proper —O—O— concentration.

The protein can be treated with the peroxide at a temperature from room temperature up to a temperature where substantial denaturation of the protein occurs. However, effective results can be obtained by heating the protein/peroxide solution to a temperature within the range of 40°–60° C. Reaction time if fairly short, 15 minutes to one hour through 15 minutes to ½ hour are effective. To insure complete contact of the materials the solution is preferably stirred during reaction. In using the preferred ultrafiltered cheese whey, it is preferred that the peroxide treatment preceed the ultrafiltration concentration of the whey. If acid whey is used, it is preferable to neutralize the acidity prior to treatment with the peroxide. The neutralization to pH 5–7 can be effected with any basic material such as an alkali metal hydroxide such as sodium hydroxide. Because the final product is intended for food use, edible grade chemicals are preferred. The whey can be defatted, dimineralized and clarified by known methods, if desired.

The amount of peroxide utilized in the treatment of the whey protein concentrate has a measurable effect on the final biscuits formed. It is preferred to utilize levels of peroxide within the range of from about 100 to 250 and preferably from about 175 to 225 parts per million. At lower levels of peroxide, i.e., 50 to 100 parts per million, biscuits of lesser structural quality are obtained.

The peroxide treated protein is a substantially oxidized protein. The peroxide is effectively destroyed in oxidizing the protein such that no residual peroxide can be detected in the oxidized whey composition.

The shortening-containing leavened baked goods contemplated to be protein enriched in accordance with the present invention include biscuits, cakes, doughnuts, and the like and mixes for preparing the same. By leavened baked goods is meant a dough lightened by a gas producing agent such as yeast or baking soda. The preferred baked goods are biscuits and the mixes therefor such as self-rising flour.

The protein composition can be added to the baked goods in any amount which does not degrade the final baked product. It has been found that the protein content can be increased as much as 20% and more over and above the normal protein content of the baked good. A normal biscuit contains between 5–7% protein. The protein content of the biscuit can, for instance, be elevated to 17% or 11% over the average protein content. However, the higher levels are generally impractical due to cost factors. The practical amount of protein fortification is less than 7.5% and preferably less than 5.0%. The protein efficiency ratio (PER) can be increased by adding small amounts of other amino acids such as lysine.

The addition of the protein fortifier requires no major changes in the baked good recipe. An adjustment in the flour or water may be required depending on the water absorption characteristics of the whey protein concentrate. This can be easily accomplished by one skilled in the art.

In some instances, the shortening requirement can be partially replaced with an undenatured, non-oxidized whey protein concentrate as disclosed in applicant's copending application Ser. No. 750,947 of R. Lauck, entitled PROTEIN ENRICHED BAKED GOODS, filed on Dec. 15, 1976, now U.S. Pat. No. 4,109,025. If it is desirable to replace a portion of the shortening in biscuits, a blend of oxidized and non-oxidized protein might be appropriate. An adjustment in the degree of oxidization of the whey protein concentrate could also be accomplished in such an instance.

The oxidized whey protein concentrate can be included in the dry ingredients used to prepare the baked good such as in a mix, i.e., self-rising flour. The oxidized protein can be admixed during the manufacture of the biscuit dough. It has also been found that the unoxidized protein can be included in in the flour blend or the dough along with the peroxide compound. Calcium peroxide is particularly adapted for this use.

Protein enriched shortening-containing baked goods such as biscuits can be obtained which show good firmness and structure using as protein fortifier an oxidized whey protein concentrate in comparison to similar biscuits prepared from non-oxidized whey protein concentrates which biscuits lacked internal structure and crumbled.

The present invention will be more fully illustrated in the examples which follow.

In the following examples, unless otherwise specified, all formulations contained the following ingredients in addition to those specified further in the Examples:

| Buttermilk | 9.3 | grams |
|---|---|---|
| Salt | 6.2 | grams |
| Sugar | 3.1 | grams |
| Bicarbonate of Soda | 5.4 | grams |
| Leavening Acid (Levair SALP available from Stauffer Chemical Company). | 5.6 | grams |
| Water | 157.5 | milliliters |

EXAMPLES 1-4

Protein-enriched biscuits were prepared by blending a peroxide treated whey protein concentrate with a shortening-containing biscuit mix (Examples 2 and 5). The amount of whey protein concentrate used was selected to achieve a set amount of protein in the final biscuit. In Examples 2-5, the protein content was approximately 13.6% based on the weight of all the dry ingredients including shortening. The peroxide treated whey protein concentrates incorporated into shortening-containing biscuit mixes (Examples 2 and 5) were compared to a control (Example 1) prepared without protein enrichment. Non-shortening-containing biscuits were prepared using a peroxide treated whey protein concentrate (Example 3) and a non-peroxide treated whey protein concentrate (Example 4). The ingredients are reported in Table I below.

In all cases, the dry ingredients were mixed together by stirring. Then the shortening was added. Based on the weight of the ingredients in the biscuits including shortening, but excluding the water added as an ingredient, the biscuits of Example 2 have 6.68% shortening and the biscuits of Example 5 have 13.37% shortening. This mixture was blended in a Hobart C-100 mixer for five minutes at speed 1. The water was then added and the dough was mixed for 15 seconds at speed 2. The dough was rolled on a cloth covered board with 1.22 centimeter (½ inch) gauge rails using a cloth covered rolling pin and dusting flour. The dough was cut into ten 5.08 centimeter (two inches) biscuits and baked in 20.32 centimeter (eight inch) round tared pans at 232° C. (450° F.) for 14 minutes.

After baking, the biscuits were evaluated for height, weight, volume, specific volume, pH and taste.

Biscuit bake tests and evaluation of the results therefrom are explained in Cereal Laboratory Methods, 6th Edition, American Association of Cereal Chemists, 1957 pp. 46-48.

The dough weight is the weight of seven biscuits just prior to baking. The biscuit weight is the weight of seven biscuits just after baking. The six most evenly sloped biscuits are measured to provide biscuit height. The volume is determined by the number of cubic centimeters of rape seed displaced by seven biscuits. Seven weighed biscuits are placed in a cake pan and rape seeds are poured over the biscuits. The rape seeds are then levelled with the top of the pan. The rape seeds in the pan are poured off and their volume measured. By substracting the value from the known volume of the entire pan, the volume of the biscuits can be determined. The specific volume is obtained by dividing the volume by biscuit weight. Biscuit weight is in grams. The specific volume is an indication of the relative lightness and fluffiness of the baked cubic centimeters per gram have been found to be unacceptable in comparison to a homemade biscuit. Tenderness and taste were determined organoleptically.

Alkalinity is determined by breaking open a baked item and applying to either the cold or hot crumb a few drops of "Stauffer Special Indicator for Self-Rising Flour" available from Stauffer Chemical Company, Westport, Conn. The color which develops indicates the acidic alkaline condition of the baked item using the following color code:

| Magenta | Alkaline |
|---|---|
| Red | Slightly Alkaline |
| Red mottled with Yellow | Normal |
| Yellow mottled with Red | Slightly acidic |
| Yellow | Acidic |

The results are reported in Table I. These examples show that the use of a peroxide treated whey protein concentrate in a shortening containing biscuit (Examples 2 and 5) provides results equivalent to the control (Example 1). Poorer biscuits are obtained using a peroxide treated whey and no shortening (Example 3). Good biscuits can also be formed using a nonperoxide treated whey protein concentrate and no shortening (Example 4) as claimed in applicant's copending application Ser. No. 750,947, now U.S. Pat. No. 4,109,025.

TABLE I

| Example | 1 | 2 | 3 | 4 | 5 |
|---|---|---|---|---|---|
| * Shortening - Emulsified | 20.8 | 14.6 | — | — | 20.8 |
| Non-Emulsified | 20.8 | 6.2 | — | — | 20.8 |
| * Flour | 240 | 215.8 | 240 | 210 | 191.4 |
| * Whey Protein Concentrate | — | 45$^a$ | 41.6$^a$ | 41.6$^b$ | 48.6$^a$ |
| Amount Peroxide, ppm | — | 70 | 70 | 0 | 200 |
| * Dough Weight | 232 | 229 | 231 | 232 | 232 |
| * Biscuit Weight | 204 | 200 | 205 | 204 | 205 |
| Height, centimeters (in.) | 22.9(9) | 22.9(9) | 22.9(9) | 22.9(9) | 22.9(9) |
| Volume, cubic centimeters | 520 | 540 | 485 | 550 | 530 |
| Specific Volume | 2.55 | 2.70 | 2.36 | 2.69 | 2.58 |
| Alkalinity | Moderate Control | Slightly | Slightly | Slightly | Slightly |
| Comments | | Tough | Dry Dough | Wetter | Dark |

TABLE I-continued

| Example | 1 | 2 | 3 | 4 | 5 |
|---|---|---|---|---|---|
| | | Sides Browner Tops | Tough Sides and Top | Dough Dark Tops | Tops Tender Sides and Tops |

<sup>a</sup>Ultrafiltered Cottage Cheese Whey
<sup>b</sup>Dextran Gel Concentrated Whey Protein From A Blend Of Cheddar And Cottage Wheys.
* Weight in grams

EXAMPLES 6-11

Using the formulation and procedure given in Example 1, biscuits were prepared using the formulations given in Table II. The biscuits were baked and evaluated as outlined in Example 1. The results are reported in Table II.

The results show that the use of a non-peroxide treated whey protein concentrate in a full shortening containing biscuit dough (Example 6) provides a dough which is too sticky to roll. The use of peroxide treated whey protein concentrate in comparative examples (Examples 7 and 8) does not provide sticky dough. Examples 7 and 8 show that the amount of peroxide used in the treatment has an effect on the dough. In Example 7, 200 parts per million peroxide was used to treat the whey. A good dough was obtained. In Example 8, only 70 parts per million peroxide was used. While good biscuits were obtained, the dough was slightly sticky.

This effect is seen in the use of non-peroxide treated whey in non-shortening containing biscuits (Examples 9-11). Example 11 which utilized a whey protein concentrate treated with only 70 parts per million peroxide gave results closer to the biscuits containing the non-peroxide treated whey protein concentrate (Example 9) than did the whey protein concentrate treated with 200 parts per million peroxide (Example 10).

TABLE II

| Example | 6 | 7 | 8 | 9 | 10 | 11 |
|---|---|---|---|---|---|---|
| * Shortening-Emulsified | 20.8 | 20.8 | 20.8 | — | — | — |
| Non-Emulsified | 20.8 | 20.8 | 20.8 | — | — | — |
| * Flour | 191.4 | 191.4 | 191.4 | 240 | 240 | 240 |
| * Whey Protein Concentrate, | 48.6<sup>b</sup> | 48.6<sup>a</sup> | 48.6<sup>a</sup> | 41.6<sup>b</sup> | 41.6<sup>a</sup> | 41.6<sup>a</sup> |
| Amount Peroxide, ppm | 0 | 200 | 80 | 0 | 200 | 70 |
| * Dough Weight | 235 | 232 | 227 | 232 | 232 | 230 |
| * Biscuit Weight | Wet Dough Cannot Be Rolled | 204 | 194 | 208 | 206 | 202 |
| Height centimeter (inches) | | 24.1(9.5) | 23.5(9.25) | 24.1(9.5) | 24.1(9.5) | 25.4(10) |
| Volume, cubic centimeters | | 590 | 575 | 610 | 515 | 570 |
| Specific Volume | | 2.89 | 2.96 | 293 | 2.50 | 2.82 |
| Alkalinity | Moderate | Moderate | Moderate | Moderate | Moderate | Moderate |
| Comments | | Good Dough | Sticky Dough | Sticky Dough Crusty | Dry Dough Tough Crusty | Acceptable Dough More Tender than Ex. 4 Crusty |

<sup>a</sup>Ultrafiltered Cottage Cheese Whey
<sup>b</sup>Dextran Gel Concentrated Whey Protein From A Blend Of Cheddar And Cottage Whey.
* Weight in grams

EXAMPLE 12-17

Using the procedure given in Example 1, biscuits were prepared using the formulations given in Table III. The biscuits were baked and evaluated as outlined in Example 1. The results are reported in Table III.

The results show that the use of a peroxide treated whey protein concentrate in a full shortening containing biscuit (Example 13) provides results comparable to a non-protein fortified biscuit (Example 12). The use of a non-peroxide treated whey protein concentrate in place of the peroxide treated whey protein concentrate of Example 13 (Example 17) provides a dough which is too sticky to roll or cut. Example 14 shows that the use of 70 parts per million peroxide in treating the whey protein concentrate provides results slightly less advantageous than the use of 200 parts per million peroxide (Example 13). Examples 15 and 16 are direct comparisons of peroxide and non-peroxide treated whey protein concentrate derived from a blend of cheddar and cottage wheys in non-shortening containing biscuits. The use of a peroxide treated whey protein concentrate (Example 16) in a non-shortening containing biscuit provides lower volume and lower specific volume than a comparable biscuit prepared using non-peroxide treated whey protein concentrate (Example 15).

TABLE III

| Example | 12 | 13 | 14 | 15 | 16 | 17 |
|---|---|---|---|---|---|---|
| * Shortening - Emulsified | 20.8 | 20.8 | 14.6 | — | — | 20.8 |
| Non-Emulsified | 20.8 | 20.8 | 6.2 | — | — | 20.8 |
| * Flour | 240 | 191.4 | 215.8 | 240 | 240 | 191.4 |
| * Whey Protein Concentrate | — | 48.6<sup>a</sup> | 45<sup>a</sup> | 41.6<sup>b</sup> | 41.6<sup>a</sup> | 41.6<sup>b</sup> |
| Amounts Peroxide, ppm | — | 200 | 80 | 0 | 200 | 0 |
| * Dough Weight | 231 | 225 | 233 | 232 | 234 | Very Sticky Dough Could Not Roll |
| * Biscuit Weight | 202 | 195 | 205 | 203 | 209 | |
| Height centimeters (inches) | 24.1(9.5) | 23.5(9.25) | 24.8(9.75) | 24.8(9.75) | 24.8(9.75) | |
| Volume cubic centimeters | 560 | 530 | 590 | 600 | 530 | |
| Specific Volume | 2.77 | 2.71 | 2.87 | 2.95 | 2.53 | |

TABLE III-continued

| Example | 12 | 13 | 14 | 15 | 16 | 17 |
|---|---|---|---|---|---|---|
| Alkalinity | Moderate | Slightly | Slightly | Slightly | Slightly Darker | or Cut |
| Comments | Control light tops tender | Darker Tops Crustier | Darker Tops some Crustiness | Dark Tops Crusty Dry Tough Dough | Tops Crusty | |

*a* Ultrafiltered cottage cheese whey
*b* Dextran gel concentrated whey protein from a blend of cheddar and cottage wheys
\* Weight in grams The invention is defined in the claims which follow.

What is claimed is:

1. A process for preparing protein-fortified biscuits containing at least 6.68% by weight based on the ingredient weight including shortening, but not including the water added as an ingredient of the biscuits of shortening which comprises adding to a normal biscuit recipe which requires no recipe change except for adjustment of flour or water, a protein fortifier comprising a whey protein concentrate wherein the protein is substantially oxidized in an amount sufficient to increase the protein level of the biscuit over the 7% protein content of a normal biscuit but no more than 20% above the protein content of said biscuit.

2. The process as recited in claim 1 wherein at least 40% of the protein sulfhydryl groups are oxidized.

3. The process as recited in claim 1 wherein at least 60% of the sulfhydryl groups are oxidized.

4. The process as recited in claim 1 wherein said biscuits are self-rising flour biscuits.

5. The process as recited in claim 1 wherein said whey protein concentrate is cottage cheese whey concentrated by ultrafiltration.

6. The process as recited in claim 5 wherein said whey protein concentrate has at least 25% by weight protein.

7. The process as recited in claim 1 wherein said whey protein concentrate has from about 40% to about 60% by weight protein.

8. The process as recited in claim 5 wherein said whey protein is treated with a peroxide oxidizing agent.

9. The process as recited in claim 8 wherein the whey protein is treated prior to ultrafiltration.

10. The process as recited in claim 1 wherein said protein is oxidized with a peroxide.

11. The product of the process of claim 1.

* * * * *